(12) United States Patent
van Manen et al.

(10) Patent No.: US 6,520,765 B2
(45) Date of Patent: Feb. 18, 2003

(54) INJECTION MOLDING APPARATUS WITH ROBOT DEVICE AND MECHANICAL PULL-OUT UNIT FOR REMOVING PREFORMS FROM THE ROBOT DEVICE, AND ROBOT DEVICE FOR AN INJECTION MOLDING APPARATUS

(75) Inventors: Dirk van Manen, Dalen (NL); Hendrikus Johannes Theodorus Albers, Dalen (NL)

(73) Assignee: Inter Tooling Services B.V., Emmen (NL)

( * ) Notice: Subject to any disclaimer, the term of this patent is extended or adjusted under 35 U.S.C. 154(b) by 229 days.

(21) Appl. No.: 09/729,974

(22) Filed: Dec. 6, 2000

(65) Prior Publication Data

US 2001/0019730 A1 Sep. 6, 2001

(30) Foreign Application Priority Data

Dec. 6, 1999 (NL) .............................................. 1013770

(51) Int. Cl.⁷ .............................................. B29C 45/42
(52) U.S. Cl. ........................ 425/547; 425/534; 425/556
(58) Field of Search ................................ 425/556, 547, 425/526, 534

(56) References Cited

U.S. PATENT DOCUMENTS

| | | | |
|---|---|---|---|
| 3,804,568 A | 4/1974 | Rees | 425/442 |
| 5,837,299 A | * 11/1998 | Bright et al. | 425/526 |
| 6,143,225 A | * 11/2000 | Domodossola et al. | 425/547 |
| 6,168,416 B1 | * 1/2001 | Galt | 425/556 |
| 6,299,431 B1 | * 10/2001 | Neter | 425/526 |

FOREIGN PATENT DOCUMENTS

| | | |
|---|---|---|
| DE | 4212115 A1 | 6/1993 |
| EP | 0592021 A1 | 4/1994 |
| EP | 0633119 A1 | 1/1995 |
| EP | 0718084 A2 | 6/1996 |

* cited by examiner

Primary Examiner—Robert Davis
(74) Attorney, Agent, or Firm—Jacobson Holman PLLC

(57) ABSTRACT

Injection molding apparatus with robot device and mechanical pull-out device for removing preforms from the robot device, the robot device comprising a number of receiving tubes for preforms, the preforms being disposed in the tubes such that a collar and a screw thread portion of the neck of the bottles to be formed reach outside the receiving tubes, and the pull-out device comprising clamping elements which are positioned opposite the robot when it is in an ejection position, while first driving means for the clamping elements are provided, which can move the clamping elements towards the receiving tubes of the robot arm and away therefrom, respectively, and second driving means which can bring the clamping elements into a closed clamping position or an opened position, as well as control means for the first and second driving means. The control means are arranged to control the clamping elements.

8 Claims, 6 Drawing Sheets

Figure 1:
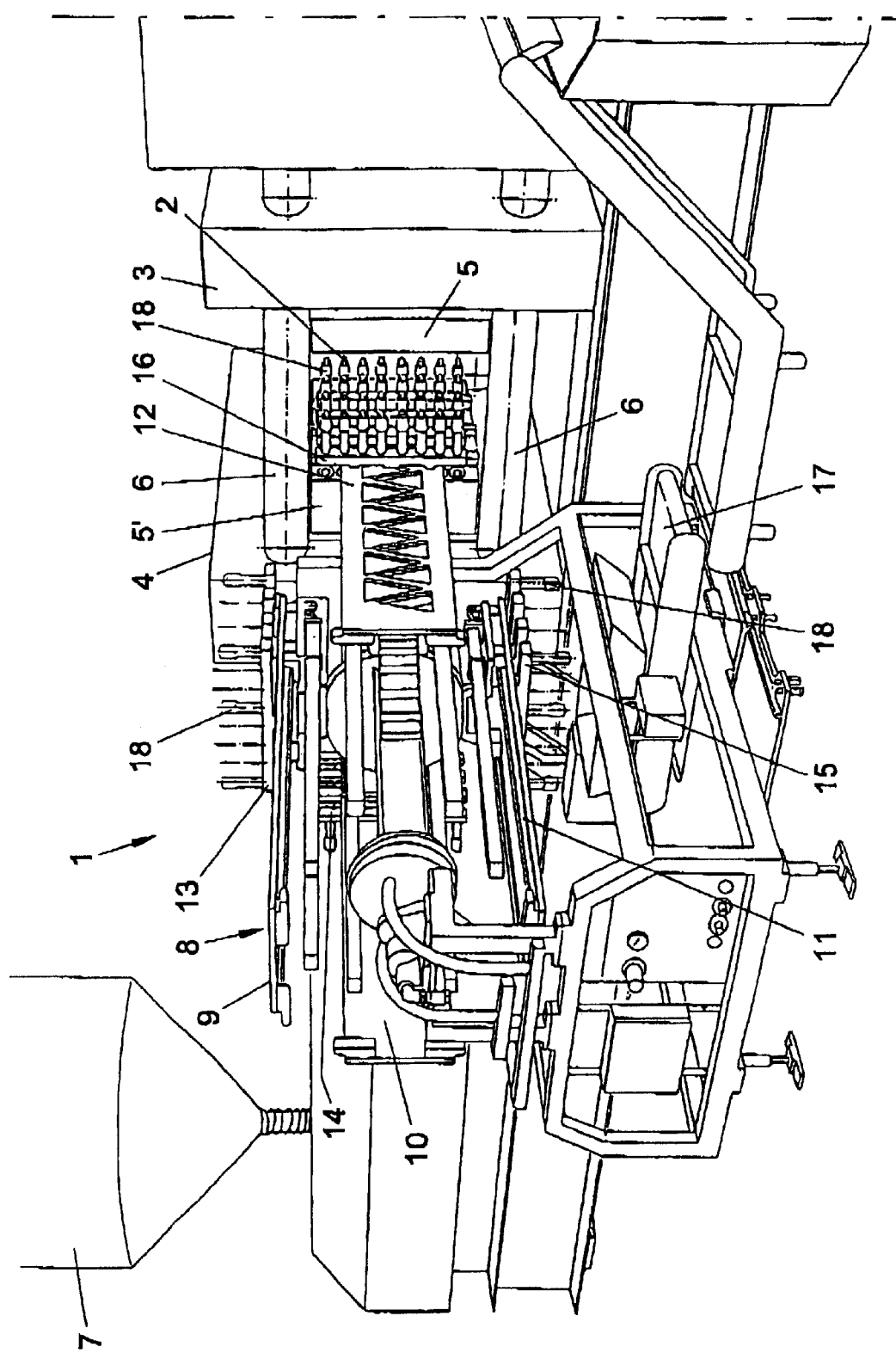

INJECTION MOLDING APPARATUS WITH ROBOT DEVICE AND MECHANICAL PULL-OUT UNIT FOR REMOVING PREFORMS FROM THE ROBOT DEVICE, AND ROBOT DEVICE FOR AN INJECTION MOLDING APPARATUS

This invention relates to an injection molding apparatus for manufacturing preforms for bottles, comprising a robot device having at least one robot arm, which is provided with a number of receiving tubes for reforms, the preforms in operation being disposed in the tubes such that a collar and a screw thread portion of the neck of the bottles to be formed reach outside the receiving tubes, and further comprising a mechanical pull-out device for removing preforms from the robot device, the pull-out device comprising a number of clamping elements which are positioned opposite the at least one robot arm if the robot arm is in a predetermined ejection position, while first driving means for the clamping elements are provided which can move the clamping elements towards the receiving tubes of the robot arm and away therefrom, respectively, and second driving means which can bring the clamping elements into a closed clamping position or an open position, as well as control means for the first and second driving means, the control means being arranged to bring, in a first step, the clamping elements in the open position to the receiving tubes with preforms, in a second step to close the clamping elements, and in a third step to move the closed clamping elements away from the receiving tubes again, whereby the preforms are at least partly pulled from the receiving tubes.

Preforms for bottles are conventionally manufactured in an injection molding apparatus in multiple injection molds having, for instance, 16 or 32 mold cavities. After the opening of a mold of an injection molding apparatus, the preforms are received in a robot arm brought between the mold parts, which robot arm removes the preforms from the injection molding apparatus and transfer them to, for instance, a cooling and/or discharge device. To that end, the robot arm is provided with a number of receiving tubes or receiving cavities which are arranged in a configuration corresponding to the configuration of the mold cavities. After opening of the mold, the preforms are situated on cores of the mold, and the receiving tubes or receiving cavities can be brought in front of the preforms and in line therewith, through suitable control of the robot arm. Thereafter, the preforms can be transferred to the receiving tubes of the robot arm in any of the manners known for that purpose. Thereupon the robot arm is retracted and the mold can be closed again for a next injection molding cycle.

The preforms usually comprise a smooth elongate tubular part, which is closed at one end. From this tubular part, the body of the plastic bottle to be produced is subsequently formed. The other end of the tubular part is provided with a neck portion provided with a screw thread or the like and a radial collar located between the neck portion and the smooth tubular part. The collar and the screw thread portion already have the eventual shape and size. The preforms are received in the tubes or cavities of the robot arm in such a manner that the tubular part of a preform lies in a tube or cavity with a close fit, while the collar and the screw thread portion project outside the tube or the cavity.

In addition to a retaining function, the tubes also have a cooling function.

The preforms are retained in the receiving tubes by means of vacuum. When the robot arm is located at a suitable place outside the injection molding apparatus, the preforms are removed from the receiving tubes. To that end, use can be made of compressed air, but it is also known to make use of mechanical ejection means. Thus, for instance, DE-A-42 12 115 discloses an ejection method whereby in each receiving tube of the robot arm, adjacent the closed end of the preform, a movable ejector element is arranged, by means of which the preform can be pushed out of the tube (or the cavity).

Further, from EP 0 633 119, ejection means are known that consist of strips mounted on the robot arm at the openings of the receiving tubes. The strips have openings which are in line with the receiving tubes. A preform received in a receiving tube reaches by its elongate tubular part through an opening in one of the strips into the tube located behind the opening, with the collar of the preform located in front of the preform, that is, on the side of the strip remote from the receiving tube. A strip can cooperate, for instance, with four receiving tubes, and a robot arm can be provided, for instance, with four strips. The robot arm further comprises operating means which move the strips away from the tubes, so that the preforms are pulled by their collars from the receiving tubes or receiving cavities.

An advantage of the use of mechanical ejection means is that the preforms are removed from the receiving tubes with greater certainty than is the case if exclusively compressed air is used.

A drawback of the above-described known mechanical ejection means, however, is that they are mounted on the robot arm, so that the weight of the robot arm increases. This makes the robot arm slower, which is undesired.

Another drawback is that the technique described in EP 0 633 199 is not suitable for preforms whose collar diameter is less than the diameter of the elongate tubular part of the preforms.

An injection molding apparatus of the above-described type, comprising a robot device and a mechanical pull-out device, is known from EP 0 718 084, In this known apparatus, the pull-out device is pivotally mounted on a moving carriage, while the pull-out device can pull the preforms from the cooling tubes of a robot arm and thereupon continues to retain the preforms for some time to transfer the preforms to a cooling device. The clamping elements are then clamped around the screw thread portion of the preforms. To prevent deformation of the screw thread portion, projections are used that fit accurately into the neck opening of the preforms.

The object of the invention is to obviate the drawbacks outlined and generally to provide a reliable and effective injection molding apparatus having a mechanical pull-out device for preforms. To that end, according to the invention, an injection molding apparatus comprising a robot device and a pull-out device, of the above-described type, is characterized in that the pull-out device is a stationary device, that the clamping elements are arranged, in the second step, to engage behind a collar of a preform, and that the clamping elements drop the preforms after the third step.

In the following, the invention will be further elucidated with reference to the appended drawings of an exemplary embodiment.

Figure 2:
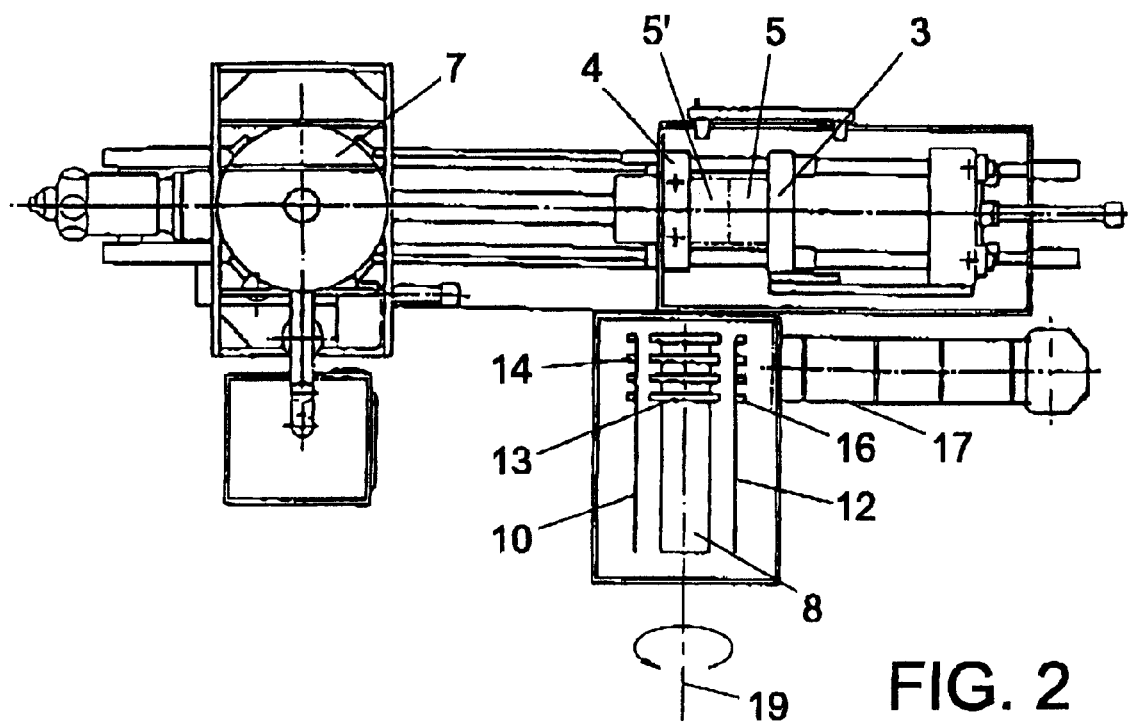
Figure 7:
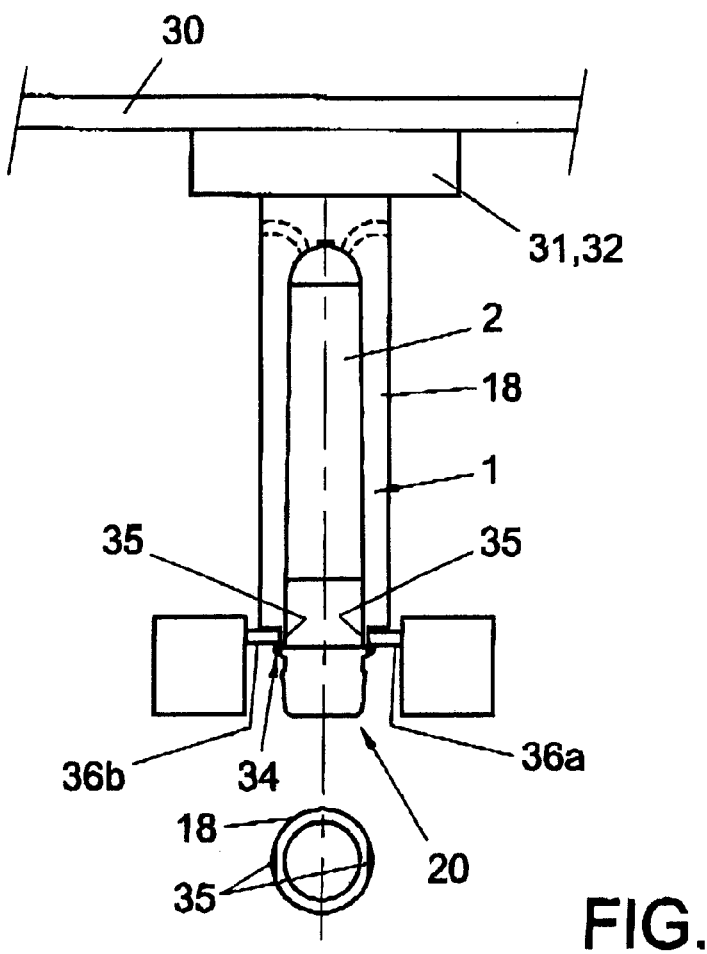
Figure 3:
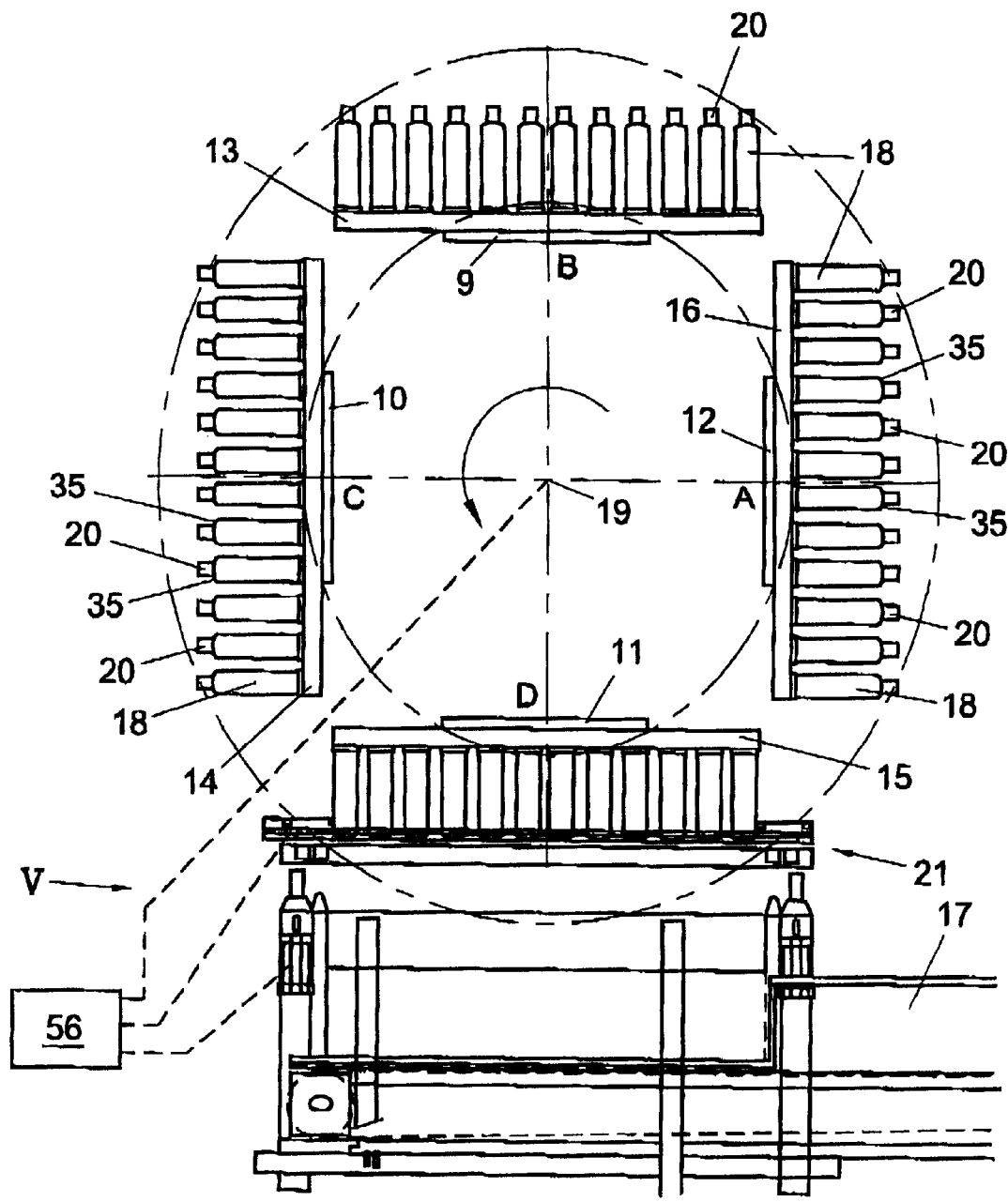
Figure 4:
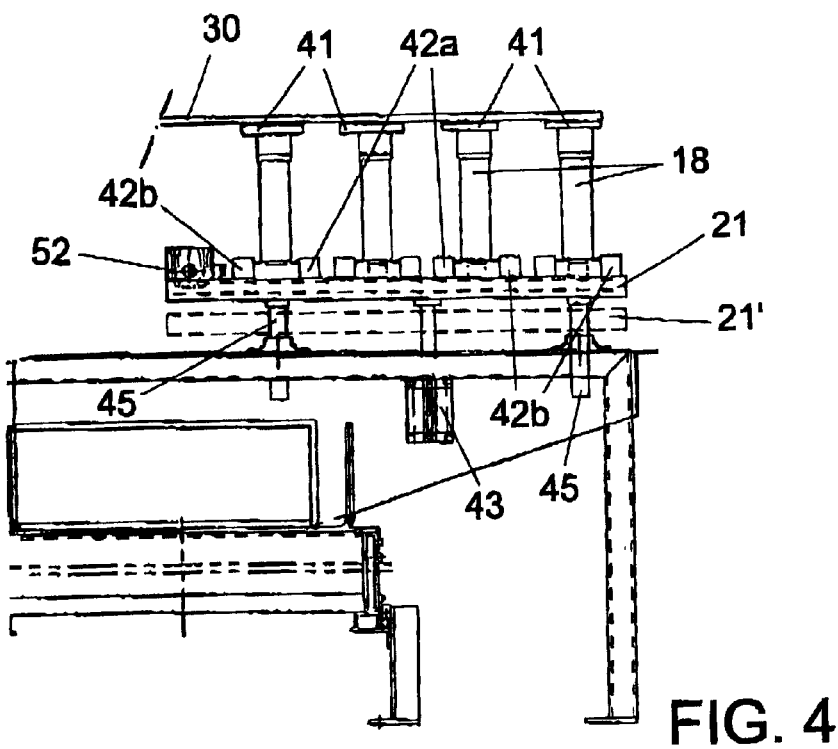
Figure 5:
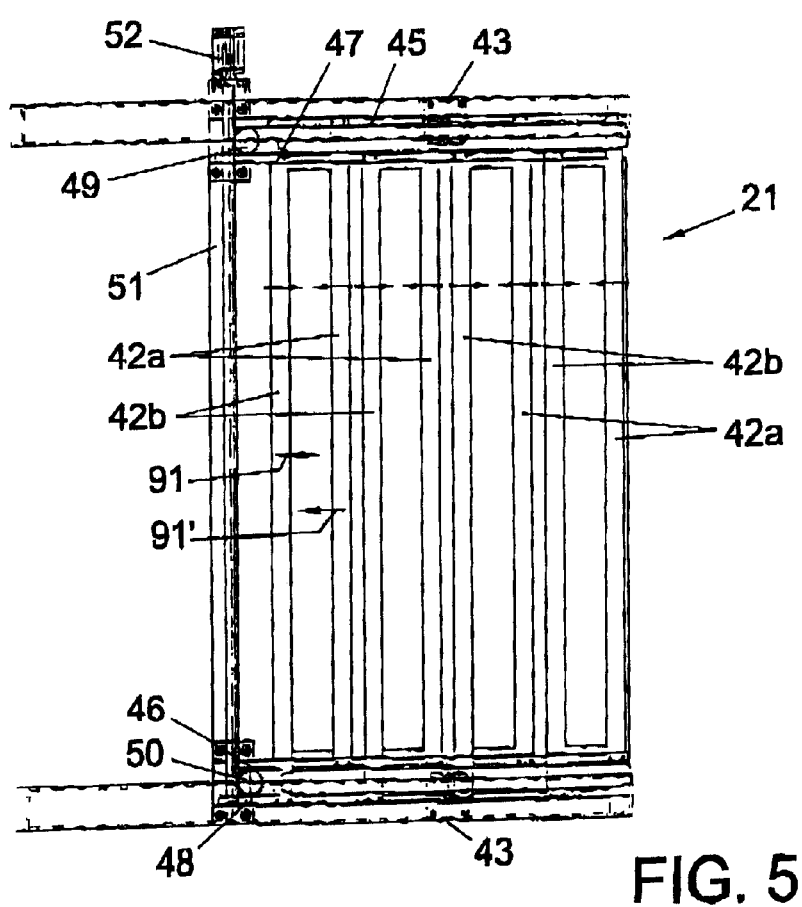
Figure 6:
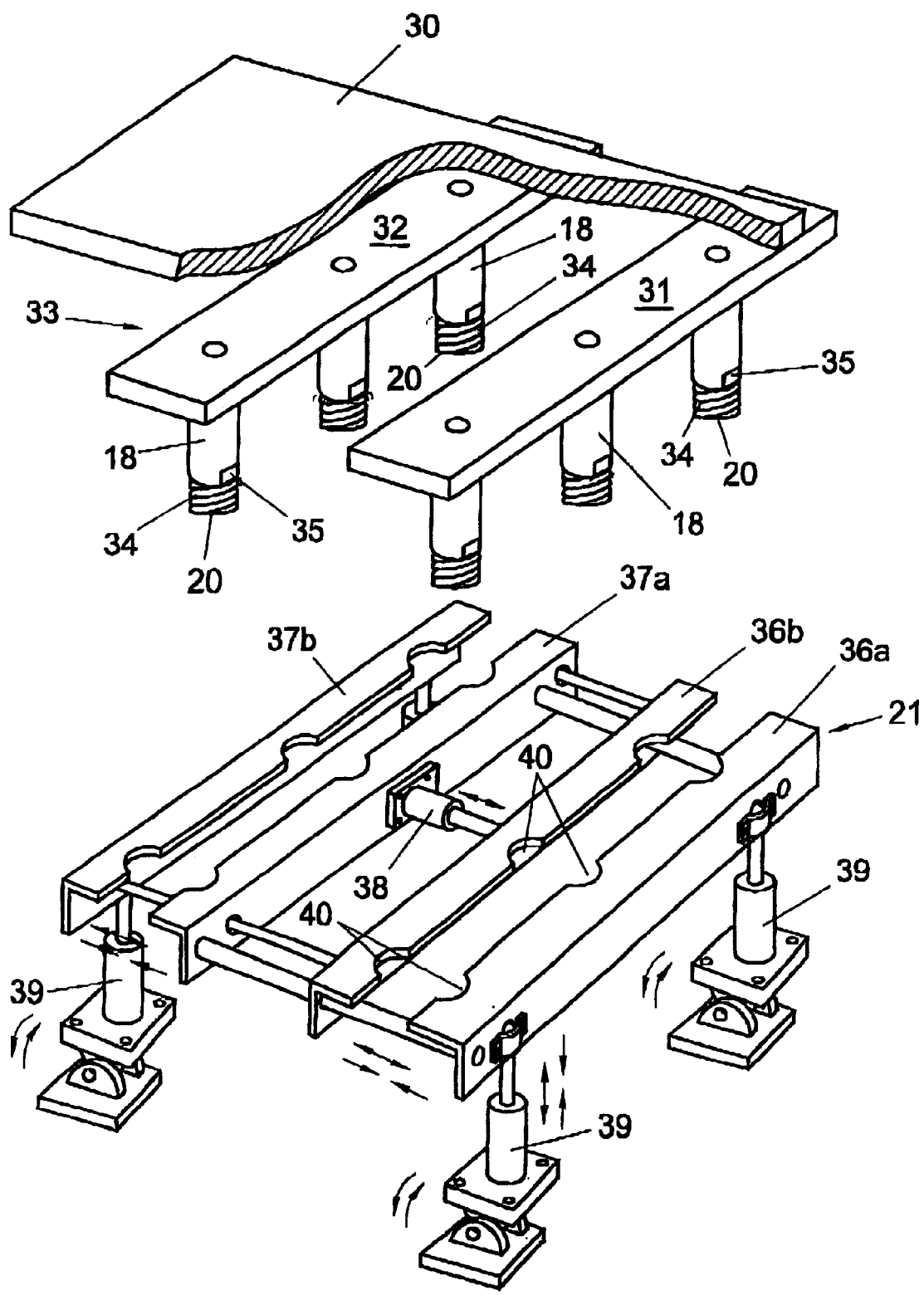
Figure 8:
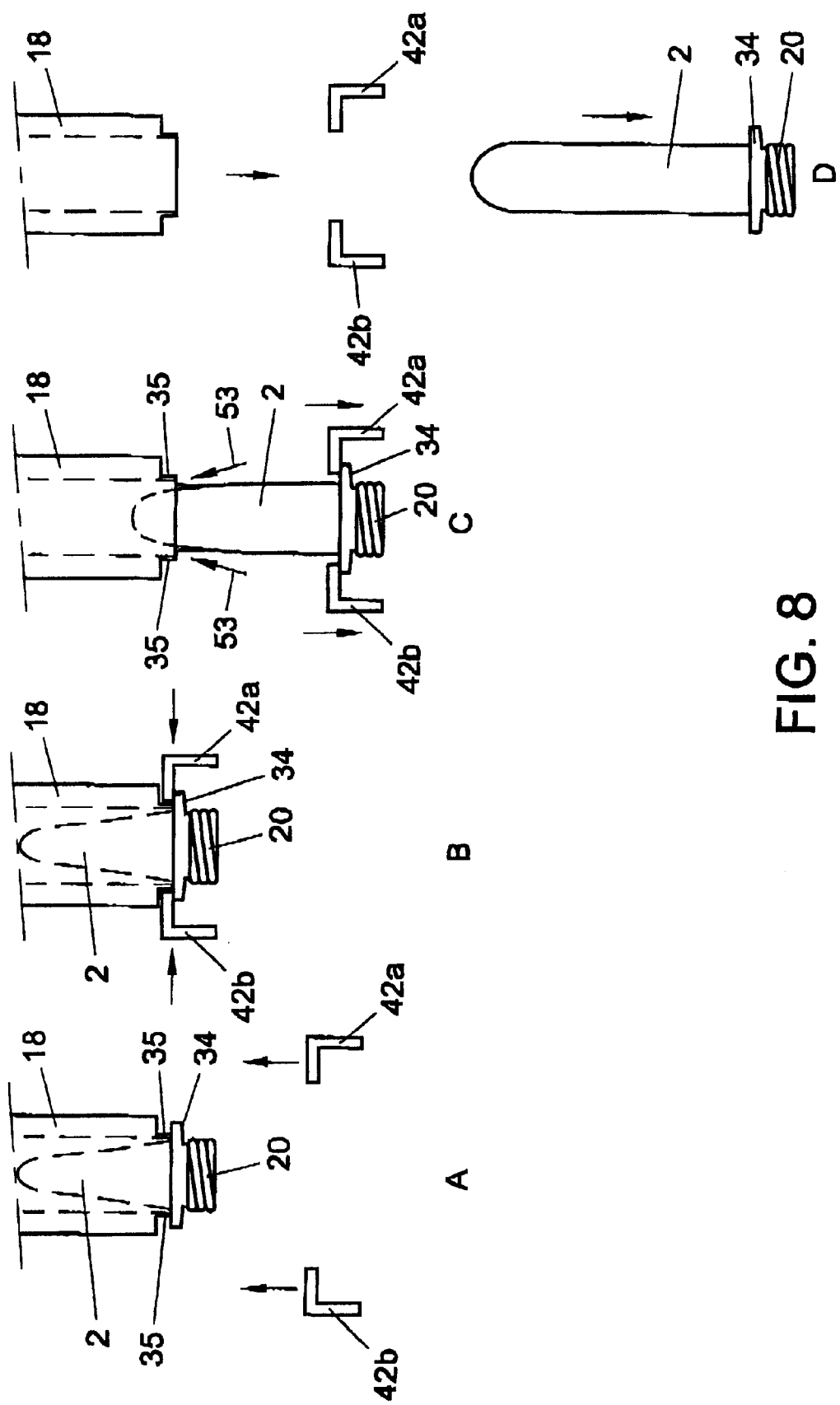

FIG. 1 schematically shows in perspective a part of an example of an injection molding apparatus for preforms, comprising a robot;

FIG. 2 schematically shows a top plan view of a similar injection molding apparatus comprising a robot;

FIG. 3 schematically shows, by way of example, an end view of a rotary robot comprising a pull-out device according to the invention;

FIGS. 4 and 5 schematically show, respectively, a view according to the arrow V in FIG. 3 and a top plan view of an example of a pull-out device according to the invention;

FIG. 6 illustrates in outline, in perspective view, the principle of operation of a pull-out device according to the invention;

FIG. 7 schematically shows, in longitudinal section, an example of a receiving tube of a robot with a preform and an example of pull-out means according to the invention; and FIG. 8 illustrates schematically, in steps a to d, an example of an ejection operation for a preform.

FIG. 1 schematically shows, in perspective, an example of an injection molding apparatus 1 for producing preforms 2 of the type shown in FIG. 7. The injection molding apparatus 1 shown comprises a mold with two plates 3, 4 with mold parts 5, 5' adapted for relative movement towards or away from each other along guide bars 6. In FIG. 1, the mold is shown in the open position. In the closed position of the mold, the mold parts jointly form a number of mold cavities to which a suitable plastic in liquid form is supplied for injection molding the preforms. The necessary stock of plastic is contained in a hopper 7.

FIG. 1 further shows a robot 8 which, in this example, comprises a rotary rotor with four arms 9 to 12, of the type described in applicant's European patent 0 592 021, which is understood to be incorporated herein by reference. Each of the arms 9 to 12 is of telescopic design and comprises a carrier 13 to 16 with receiving tubes or the like, which can be moved between the parts 5, 5' of the opened mold to remove the newly produced preforms from the mold.

In the situation shown in FIG. 1, the arm 12 with the carrier 16 reaches into the mold. The robot can rotate about a central axis, in this example horizontal, indicated in FIG. 2 at 19. When the arm 12 is retracted again, it proceeds to take successively the positions of the arms 9, 10 and 11 in the next phases of the rotation of the robot. The four possible positions are indicated in FIG. 3 by A, B, C and D. In position A, a robot arm takes up the preforms just formed in the mold.

In the positions B and C, the preforms can cool and in the lower position D the preforms are removed from the receiving tubes and collected on a discharge conveyor 17.

The carriers 13 to 16 can be plate-shaped carriers, but the carriers often consist of a number of parallel strips, each in turn carrying a number of receiving tubes, also referred to as cooling pipes. A few cooling pipes are indicated by reference numeral 18.

FIG. 2 schematically shows a similar apparatus to that shown in FIG. 1, in top plan view, with corresponding parts indicated by the same reference numerals as in FIG. 1. In FIG. 2 the mold is in the closed position and all robot arms are in the rest position. The central rotation axis of the robot is designated in FIG. 2 by 19.

FIG. 3 schematically shows, in end view, an example of a similar robot to that shown in FIGS. 1 and 2. The four possible positions that each robot arm passes in succession are indicated by A, B, C and D. In the situation shown, in the cooling pipes 18, preforms are received, of which the screw thread portions 20 projecting from the cooling pipes are visible.

In position D, the cooling pipes have their open ends facing down, so that the preforms pulled loose with a pull-out device 21 according to the invention can, under the influence of gravity, fall down further to end up, for instance, on a discharge conveyor 17.

FIG. 6 illustrates in outline the principle of operation of a central pull-out device 21 according to the invention. In operation, the device 21 shown in FIG. 6 is placed opposite a robot arm position in which the cooling pipes 18 of the robot arm are directed downwards. It is noted, however, that a pull-out device according to the invention is suitable to pull preforms at least partly from the cooling pipes in any desired position of a robot arm. Also, a pull-out device according to the invention can be employed both in a single robot and in a multiple robot In FIG. 6 the end of a robot arm 30 is to be seen, having a carrier 33, consisting of two strips 31, 32 in this example, with three cooling pipes 18 carried on each strip. Present in the cooling pipes are preforms which are retained by underpressure. The threaded parts 20 of the preforms project outside the cooling pipes, and the collar 34 of each preform lies against the end face of the corresponding cooling pipe. See also FIG. 7. Each cooling pipe is provided, at the open end thereof, with two opposite recesses or flattened portions 35. These flattened portions make it possible to bring a pull-out tool behind the collar 34 to pull a preform from a cooling pipe.

Serving as pull-out tool are pairs of cooperating engaging elements, preferably consisting of pairs of clamping strips 36a, 36b and 37a, 37b, respectively, movable towards and away from each other, and capable of gripping all preforms of a row of cooling pipes.

The clamping strips are shown in FIG. 6 in the rest position and in FIG. 7 in the operating position. To enable the clamping strips to be moved towards and away from each other, a horizontal cylinder 38 is shown in FIG. 6 to clarify the principle. The cylinder 38 moves the inner clamping strips 36b, 37a away from each other or towards each other. The outer clamping strips in this example are arranged fixedly, so that the distance between the two strips of a respective pair is reduced or increased.

In the situation shown in FIG. 6, the damping strips are in the open position and located at a distance under the cooling pipes. As soon as a robot arm is located straight above (or opposite) the pull-out device, the clamping strips are moved up by suitable means for that purpose, such as, for instance, the vertical cylinders 39 shown in outline in FIG. 6. When the clamping strips have reached the flattened portions 35 at the open end of the cooling pipes, the clamping strips are closed, so that the clamping strips engage behind the collars of the preforms, as shown in FIG. 7.

Next, the clamping strips are moved down by means of the cylinders 39, so that the preforms are pulled at least partly from the cooling pipes. All this will be further elucidated in the following with reference to FIG. 8.

In the outline of FIG. 6, the clamping strips are provided, adjacent the engagement locations for the preforms, with recesses 40. However, this is not strictly necessary. In the case where the collars of the preforms have a diameter that is greater than the outside diameter of the cooling pipes, at any rate of the end of the cooling pipes, suitably shaped recesses can yield a better engagement of the collars of the preforms by the clamping strip.

After the preforms have been (partly) pulled from the cooling pipes, the clamping strips are opened again, so that the preforms can fill down unhindered. As soon as the preforms have been removed from the cooling pipes, a next robot arm with preforms can be brought opposite the pull-out device 21 at a time determined by the injection molding cycle, and the above-described process can repeat itself. If only a single robot arm is present, the robot arm, after having delivered the preforms, must be filled with preforms again and then be brought directly opposite the pull-out device again. If a multiple robot with a plurality of arms is used, preforms that have just been received in the cooling tubes of a robot arm can first cool off during one or more complete injection molding cycles before being removed FIGS. 4 and 5 schematically show an end view and a top plan view of a practical exemplary embodiment of a pull-out device 21 according to the invention. FIG. 4 shows a robot arm 30 with four carriers 41, each carrying a row of cooling pipes 18. Adjacent the free end of the cooling pipes, there are pairs of clamping strips 42a, 42b, with each clamping strip comprising a flat flange capable of engaging behind the collars of the preforms in the cooling pipes. In this example, too, the cooling pipes are provided with flattened portions at the open end.

FIG. 4 shows the pull-out device in the upper position. At 21', broken lines indicate the lower position. The up and down movement of the pull-out device in this example is effected by two vertical cylinders 43, while further use is made of guide bars 46.

For the movement of the clamping strips 42a, 42b, in this example, the ends of the clamping strips are connected with gear racks, or extensions thereof. The clamping strips 42a are jointly connected with gear racks 45 and 46, while the clamping strips 42b are jointly connected with gear racks 47 and 48. The gear racks 45 and 47 are located opposite each other at one end of the clamping strips and are driven by the same gearwheel 49, so that the gear racks 45 and 47, and hence also the clamping strips coupled thereto, move in opposite directions. The same is true of the gear racks 46 and 48 at the other end of the clamping strips, which are driven by a corresponding gearwheel 50.

The two gearwheels 49 and 50 in this example in turn are driven by a common rack bar 51, which extends parallel to the clamping strips and which is reciprocable in the longitudinal direction by means of a drive cylinder 52.

FIG. 8 schematically shows once more a pull-out cycle in four steps a to d. In step a, the clamping strips move in the open position towards the cooling pipes 18 holding preforms retained in the pipes through underpressure. After reaching the proper position, in step b the clamping strips are dosed, so that they fall behind the collars 34 of the preforms. The cooling pipes are preferably provided, at the mouth thereof, with recesses 35 to ensure a proper engagement. In step c the preforms are subsequently pulled partly from the cooling pipes in that the clamping strips are moved down. Preferably, this occurs while in the cooling pipes still an underpressure prevails. Due to the preforms having a slightly conically clearing shape, in the situation of step c, air is drawn alongside the preforms as indicated by arrows 53. This provides for additional cooling of the preforms. Finally, in step d the preforms are blown from the cooling pipes in that the underpressure is changed into an overpressure. The clamping strips can be opened before, during or after the preforms have been blown out, to be ready for step a of a next cycle. Of course, it is possible, as a variant, to pull the preforms completely mechanically from the cooling pipes. The up-and-down stroke of the clamping strips must then be greater. Step d can then either be omitted or consist merely in pulling the preforms further from the cooling pipes after step c. Also, the underpressure may be switched off sooner, for instance during step a or step b.

For the control of the driving means of the pull-out device, i.e. the cylinders 43 and 52 in the example of FIGS. 4 and 5, and for the control of the underpressure and overpressure in the cooling pipes, control means (not shown) are provided, which are coupled to or integrated into the control means already present for the injection molding apparatus and the robot device. Such control means are schematically indicated in FIG. 3 at 56.

It is noted that after the foregoing, various modifications will readily occur to those skilled in the art, in particular insofar as mechanical constructions and driving means are concerned.

What is claimed is:

1. An injection molding apparatus for manufacturing preforms for bottles, comprising a robot device having at least one robot arm, provided with a number of receiving tubes for preforms, the preforms in operation being disposed in the tubes such that a collar and a screw thread portion of the neck of the bottles to be formed reach outside the receiving tubes, and further comprising a mechanical pull-out device for removing preforms from the robot device, the pull-out device comprising a number of clamping elements which are positioned opposite the at least one robot arm if the robot arm is in a predetermined ejection position, while first driving means for the clamping elements are provided, which can move the clamping elements towards the receiving tubes of the robot arm and away therefrom, respectively, and second driving means which can bring the clamping elements into a closed clamping position or an open position, as well as control means for the first and second driving means, the control means being arranged to bring, in a first step, the damping elements in the open position to the receiving tubes with preforms, in a second step to close the clamping elements, and in a third step to move the closed clamping elements away from the receiving tubes, whereby the preforms are at least partly pulled from the receiving tubes, characterized in that the pull-out device is a stationary device, that the clamping elements are arranged to engage, in the second step, behind a collar of a preform, and that the clamping elements drop the preforms after the third step.

2. An apparatus according to claim 1, characterized in that said control means are arranged to cooperate with control means of the robot device, such that at least during the third step an underpressure is generated in the receiving tubes, which causes an air flow along the preforms as soon as they have been partly pulled from the receiving tubes.

3. An apparatus according to claim 1, characterized in that the clamping elements comprise a number of pairs of cooperating clamping strips, while each pair of clamping strips can simultaneously engage the preforms in a row of receiving tubes.

4. An apparatus according to claim 1, characterized in that the second driving means comprise at least one operating cylinder.

5. An apparatus according to claim 1, characterized in that the second driving means comprise a rack bar reciprocable in the longitudinal direction, cooperating at each end with a gear wheel, each gear wheel in turn cooperating with a pair of gear racks which upon rotation of the gear wheel move in opposite directions, the gear racks of a pair of gear racks being coupled to opposite parts of the clamping elements.

6. An apparatus according to claim 1, characterized in that the robot device comprises a rotatable rotor which carries a number of robot arms which during operation successively cooperate with the pull-out device.

7. A robot device for an injection molding apparatus, characterized in that the robot device is arranged for use in an injection molding apparatus according to claim 1, the robot device having at least one arm with receiving tubes for preforms, as well as control means which during operation can periodically bring the at least one arm into a predetermined ejection position in which the preforms can be engaged by the pull-out device.

8. A robot device according to claim 7, characterized in that the receiving tubes for the preforms are provided, at the open end, on opposite sides thereof, with a recess in which the clamping elements of the pull-out device can engage behind the collar of a preform.

* * * * *